Figure 1:
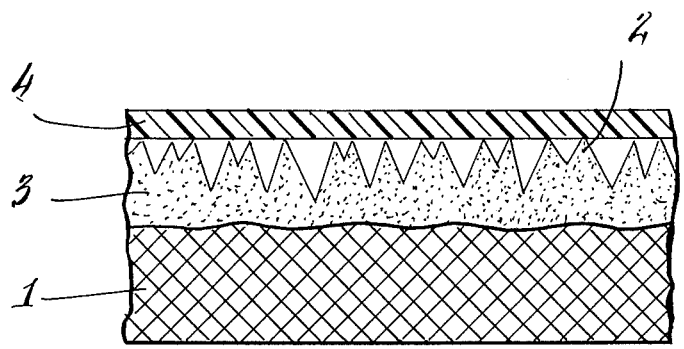

United States Patent [19]

Fukushima et al.

[11] 4,028,161

[45] June 7, 1977

[54] METHOD OF MAKING SHEET MATERIAL

[75] Inventors: Osamu Fukushima; Kazuo Nagoshi; Toshiaki Iwamoto, all of Kurashiki, Japan

[73] Assignee: Kuraray Co., Ltd., Kurashiki, Japan

[22] Filed: Oct. 29, 1974

[21] Appl. No.: 518,830

Related U.S. Application Data

[63] Continuation-in-part of Ser. No. 64,721, Aug. 18, 1970, abandoned.

[52] U.S. Cl. .................................. 156/153; 428/85; 428/91; 428/315; 428/320
[51] Int. Cl.² ........................................ B32B 31/20
[58] Field of Search ............... 156/153, 154, 237; 117/8, 11, 45, 63, 64, 76 T; 161/159, DIG. 2; 428/85, 86, 91, 315, 320, 321

[56] References Cited

UNITED STATES PATENTS

| | | | |
|---|---|---|---|
| 3,067,483 | 12/1962 | Hollowell | 428/91 |
| 3,264,805 | 7/1966 | Aoki | 117/11 |
| 3,284,274 | 11/1966 | Hulslander et al. | 156/153 |
| 3,565,670 | 2/1971 | Shinohara et al. | 117/64 |
| 3,764,363 | 10/1973 | Civardi et al. | 117/11 |

Primary Examiner—Caleb Weston
Attorney, Agent, or Firm—Barry Kramer

[57] ABSTRACT

A sheet material having leather-like grain, excellent scuffing and abrasion resistance and superior dyeability comprising in combination, a substrate, and intermediate layer of 0.05 to 2.5 mm thickness consisting of a finely napped porous polymer bonded to said substrate and an upper layer consisting of a polymeric coating of thickness ranging from 1–100 microns. In typical embodiments, the upper layer may be a polymeric coating material such as linear or cross-linked polyurethanes, the intermediate layer may be a porous polyester, polyamide, vinyl or elastomeric polymer, e.g. a polyurethane, and the substrate may be a woven or non-woven fabric. In preparation of this sheet material, the intermediate layer is pressed and condensed to about 10 to 90% to a density of from about 0.20 to 0.50 g/cc.

10 Claims, 2 Drawing Figures

METHOD OF MAKING SHEET MATERIAL

CROSS-REFERENCE TO RELATED APPLICATION

This is a continuation-in-part of application Ser. No. 64,721, filed on Aug. 18, 1970, now abandoned.

This invention relates to a novel sheet material. More particularly, it relates to a sheet material which is superior in appearance and surface properties.

Substrates, such as cloth, coated by a polymer paste and substrates bonded to a porous polymeric layer have been conventionally used as sheet materials. However, the former sheet materials are rigid, heavy and cold to the touch, though excellent in surface scuffing resistance and abrasion resistance because of direct polymer coatings. The latter is inferior in surface scuffing resistance, abrasion resistance and in dyeability because of the porous polymeric structure, though it can be made flexible, light and soft to the touch by adjusting the porosity properties of the polymer.

It is an object of the present invention to provide a sheet material having good leather-like grain, excellent surface scuffing and abrasion resistance and superior dyeability. Other objects will be apparent from the following description pf this invention.

The foregoing objects have been accomplished in a simple and effective matter by the novel sheet material of this invention.

Figure 2:

The invention will be described in conjunction with the drawing in which FIGS. 1 and 2 are sectional views of the sheet material of this invention.

Referring to FIGS. 1 and 2 the sheet material of this invention comprises a substrate 1, an intermediate layer 3 and an upper layer 4, said layer 3 consisting of a finely napped porous polymeric layer adhering to the substrate 1 and the upper layer 4. In FIG. 1 the naps 2 are in a substantially upright position. In FIG. 2, which represents a preferred embodiment, the naps 2 of the finely napped porous polymeric layer are laid down. The upper layer 4, consists of a non-porous polymeric coating of thickness ranging from 1 to 100 microns, preferably 5 to 30 microns, as is shown in the drawing.

In the sheet material, according to the present invention, the non-porous polymeric coating of 1 to 100 microns thickness provides high scuffing and abrasion resistance and dyeability, and the finely napped porous polymeric layer below it provides the feeling of softness. Further, a balanced combination of said external polymeric coating and the internal finely napped layer provides a good calf leather-like grain appearance which cannot be obtained with conventional sheet materials, thus remarkably enhancing its commercial value as a substitute product for leathers used for shoes, bags, furniture coverings and the like.

The finely napped porous polymeric layer is obtained by abrading or tearing a porous polymeric layer formed by the coagulation of a polymeric solution layer or the foaming of a polymeric layer or solution layer or by bonding polymeric particles having a porous structure to each other. The porous polymeric layer may be bonded to the substrate after the layer has been formed or alternatively, the porous polymeric layer may be formed directly on the substrate. The state of napping can be controlled by the manner of abrading and tearing and the conditions of coagulation and foaming. It is most preferable to use a napped layer obtained by abrading or tearing a macro-porous polymeric layer obtained by wet-coagulating a polymeric solution layer in a coagulation bath containing non-solvent for the polymer.

The finely napped porous polymeric layer at this point is characterized by a thickness of approximately 0.05 to 2.05 mm, preferably 0.1 to 1.0 mm and a density of approximately 0.10 to 0.30 g/cc and a nap length in the range of approximately 0.03 to 0.5 mm. The naps may be randomly bar, plate, polygon and pyramidal in shape and they may have other complex shapes. The napped layer comprises minute pores of approximately 0.1 to 100$\mu$ in diameter. The porous substrate is preferably positioned beneath the napped layer so as to strengthen the naps.

Among the polymers which may be used for the construction of the porous polymeric layer are the following: condensation polymers such as polyesters, e.g., polyethylene terephthalate and polyamides, e.g., nylon-6 and nylon-6,6; vinyl polymers and vinyl copolymers such as polyacrylonitrile, polyvinylacetate, polyvinyl alcohol, polypropylene, polyvinyl chloride, polyethylene, vinyl acetate-acrylonitrile copolymers, polymethacrylic acid esters, polyacrylic acid esters, and the like; elastomeric polymers such as linear polyurethane elastomers (PUE), cross-linkable binary liquid polyurethane elastomer (PUE), polyisoprenes, acrylonitrilebutadiene copolymers, styrene-butadiene copolymers and the like. Polyurethane elastomers and mixtures of polyurethane elastomers and other polymers described above are preferably utilized because of their desirable elastic and physical properties.

The porous polymeric layer is pressed and condensed by approximately 10 to 90%, preferably 40 to 70% from the original thickness by means of heated rolls, heated plates and the like, in order to obtain a layer having a density of approximately 0.20 to 0.05 g/cc. In order to produce, with ease, sheet material having a good appearance and excellent surface properties, it is preferable that said layer, prior to compression by application of heat and pressure with a heated plate or rolls, be treated with a swelling agent for the polymer, or a solution of a polymer dissolved in the swelling agent, or preferably a two-liquid type curable polyurethane elastomer comprising a basic material and a cross linker. After the surface is made flat, the porous polymeric layer contains minute voids of approximately 0.1 to 50 microns in diameter and voids of approximately 20 to 500 microns due to laying down the naps.

If an ordinary porous polymeric layer is pressed and heated to make a flat surface, the porous structure will be destroyed and thus the formed surface will be as rigid and poor in vapor permeability as prior sheet materials directly coated with polymers. On the contrary, the present invention provides sheet materials of flexible and soft texture and excellent vapor permeability because the porous structure of the polymer remains substantially intact even after surface treatment, and intervening spaces exist in and between the compressed interlocking naps.

Surface scuffing resistance and abrasion resistance of the final product of the invention are enhanced when the naps of the porous polymeric layer are bound one to another after surface treatment by application of a polymeric solution or a cross-linking two-liquid type polyurethane to the napped porous polymeric layer during the step of laying down the naps. As the polymeric material to be applied to the finely napped, porous polymeric layer, there may be used the polymer used to make the porous polymeric layer, preferably a substantially linear PUE which is soluble in a solvent and is of the cross-linkable two-liquid type PUE. It is preferable to use a solvent which does not substantially liquify the polymeric material composing the naps, though any solvent is applicable if the polymer used is soluble therein. It is most preferable to use a volatile solvent.

The two-liquid type PUE to be used in making the napped porous polymeric layer, comprises (1) the basic material which is a high molecular polyhydroxyl compound having reactive hydroxyl groups at its both ends and which may be prepared by reacting relatively low molecular weight polyhydroxyl compound with polyisocyanate to obtain a higher molecular weight polymer, and (2) the cross-linker which is a high molecular polyisocyanate compound which has at least two reactive isocyanate groups.

As polyhydroxyl compounds to be used as the basic material, there may be named poly-polyalkylene-ether glycols with a molecular weight of 500 to 5,000 such as polyethylene glycol, polypropylene glycol and polytetramethylene glycol, polyols of low molecular weight such as ethylene glycol, propylene glycol, tetramethylene glycol, hexamethylene glycol and hexanetriol and polyester glycols with molecular weights of 500 to 5,000 such as polyethylene adipate, polybutylene adipate and polycaprolactone glycol.

As isocyanate compounds to be used as the cross-linker, there may be named compounds with aliphatic and/or aromatic diisocyanate groups such as toluene diisocyanate, naphthylene diisocyanate, p,p'-diphenylmethane diisocyanate (abbreviated to MDI hereinafter), xylylene diisocyanate, hexamethylene diisocyanate and the like.

As solvent for the basic material and cross-linker there may be used any solvent which dissolves them. It is, however, preferred to use a solvent which does not liquefy a major part of the porous structure if the solution is to be applied to the naps. The porous structure may be swollen unless most part thereof is dissolved. It is possible to add a solution of a catalyst to accelerate reaction, dyestuffs, pigments and various stabilizers to the above basic material and cross linker for the two-liquid type polyurethane.

The polymeric solution of the two-liquid type polyurethane is applied to the porous polymeric layer by ordinary means such as by spraying, brushing, knife coating, coating by extruding a coating substance through a slit, roll coating by flat roll or gravure roll and dipping. The type and quantity of solid components in the solution are selected to fit the uses of the product. It is preferred that the surface of the finely napped porous polymeric layer be made flat under high pressure and elevated temperature after most of the solvent of the applied polymer solution or two-liquid type polyurethane has been evaporated and before the cure of the two-liquid type polyurethane has been completed, that is, after a period in the range of 1 minute to 24 hours has passed, depending upon the conditions of temperature and air velocity. The two-liquid type polyurethane is apt to adhere to the surfaces used for applying compression to the layer if it stands for a shorter time than the above-stated period, whereas it is apt to provide insufficient pressing effects if left to stand too much longer than the above-stated period before compression is applied. The temperature depends on the kinds of polymers comprising the napped layer, the optimum temperature for the aforementioned polymers ranging between 30° C and 200° C. There may be used rolls and plates with surface, which may be smooth or embossed with a leather-like pattern, to lay down the naps of the napped layer. The thickness of the napped layer is decreased by approximately 10 to 90% under pressure of the above treatment and consequently the final thickness thereof is decreased to approximately 10 to 90% of the original thickness. The napped layer is provided with sufficient vapor permeability, but with insufficient scuffing resistance if there is a too small decrease of thickness, whereas it is provided with excellent scuff resistance but with reduced vapor permeability in the case of a too large decrease of thickness. It is concluded from the foregoing that the required range of decrease in thickness lies between 10 and 90%, preferably from 40 to 70%, of the original thickness.

After the surface treatment, the solvent is removed, if necessary. When the two-liquid type polyurethane is used, it is left to complete curing thereof.

As the polymeric material to be used as the upper layer, it is preferred to use the polymeric material used to make the porous polymeric layer. It is preferred to use a linear solvent-soluble polyurethane elastomer, a cross-linked polyurethane elastomer or a blend of a polyurethane elastomer and other polymer of the above-mentioned classes in order to obtain a product with high abrasion resistance, soft feel and excellent dyeability. The polymeric material may contain dyestuffs, pigment, stabilizer and antistatic agent.

The upper layer may be put on the napped porous polymeric layer by roll coating or spraying a polymeric solution or dispersion or by the process by which the previously formed polymeric layer was bound to the napped surface under heating action or by making use of an adhesive to adhere a preformed self-supporting film of polymer. It is preferable to transfer and bond a polymeric coating formed on a support to the napped surface by means of an adhesive or by heating action or under conditions such that slight fluidity still remains after a polymeric solution is spread over the support and most of the solvent of the solution is removed by evaporation. The method in which the polymeric solution is not directly applied to the napped surface is superior because the napped surface is not damaged even with use of a solution of a polymer in which the solvent can dissolve the polymeric substance forming the napped, porous layer, and further, the polymeric layer to be bonded is held by the support until it is transferred, so that it is not necessary to handle it by itself in an unsupported state.

As the support, there may be used a sheet, plate or roll made of metal or synthetic resin, such as polyethylene, polypropylene, polyvinyl alcohol, polyamide, polyester, polytetrafluoroethylene, polytrifluorocthylene silicone rubber. Release paper covered with a synthetic resin mentioned above, may also be used. In order to obtain leather-like surface pattern, it is possible to emboss upon the sheet, plate or roll a leather-like pattern.

It is preferred that the upper layer comprises two or more laminae, more preferably two or three laminae in which the bottom lamina —i.e. the one applied to the napped porous polymeric layer —is a cross-linked polyurethane elastomer. The most desirable upper layers are those of laminar construction as shown in the following table.

TABLE

| Case | Top Lamina (Composition and Thickness) | Upper Layer Middle Lamina (Composition and Thickness) | Lower Lamina (Composition and Thickness) |
|---|---|---|---|
| 1 | A cross-linked PUE of 0.2–20μ, preferably 1–6μ thick. | A solvent-soluble substantially linear PUE of 0.4–40μ, preferably 2–12μ thick. | A cross-linked PUE of 0.4–40μ, preferably 2–12μ thick. |
| 2 | A solvent-soluble substantially linear PUE of 0.4–40μ, preferably 2–10μ thick. | None | A cross-linked PUE of 0.6–60μ, preferably 3–20μ thick. |
| 3 | A solvent-soluble substantially linear polymeric material of 0.2–20μ, preferably 1–6μ thick. | A solvent-soluble substantially linear PUE of 0.4–40μ, preferably 2–12μ thick. | A cross-linked PUE of 0.4–40μ, preferably 2–12μ thick. |
| 4 | A solvent-soluble substantially linear PUE of 0.2–20μ, preferably 1–6μ thick. | A cross-linked PUE of 0.4–40μ, preferably 2–12μ thick. | *A cross-linked PUE of 0.4–40μ, preferably 2–12μ thick. |
| 5 | A cross-linked PUE of 0.4–40μ, preferably 2–10μ thick. | None | **A cross-linked PUE of 0.6–60μ, preferably 3–20μ thick |

*This lamina is softer than the middle lamina.
**This lamina is softer than the top lamina.

It is preferred that the Young's modulus of the top lamina be larger than that of the middle lamina by more than 1 Kg/mm², preferably by more than 10 Kg/mm², thereby imparting scuff resistance and solvent resistance to the upper layer and giving good touch and enhanced wrinkle properties to the sheet material by being in balanced relation with the flexible lower lamina.

In Case 1, the top lamina comprising the cross-linked polyurethane and the middle lamina comprising substantially linear polyurethane elastomer have high folding endurance. Further the lower lamina increases scuff and solvent resistance of the product and contributes to the bonding of the upper layer to the intermediate layer.

In Case 2, the top lamina, comprising substantially linear polyurethane elastomer, is superior in abrasion resistance and folding endurance and the lower lamina, comprising a cross-linked polyurethane elastomer, is firmly combined with the middle layer giving a product having high durability.

In Case 3, the top lamina comprises a substantially linear polymer and the middle lamina comprises a solvent-soluble substantially linear polyurethane elastomer, so that they are superior in folding durability and the lower lamina increases bonding force between the upper layer and the middle layer.

In Case 4, the composition of the lamina is essentially the same as in Case 2, but in this case the cross-linked PUE is separated into two laminae, that is, the middle lamina which imparts to the upper layer scuff and solvent resistance and the lower lamina which plays a role in binding the upper layer and the middle layer.

In Case 5, the laminae consist of cross-linked PUE alone. In this case the top lamina is rigid and has good scuff and solvent resistance, whereas the lower lamina is supple and has folding resistance.

The cross-linked polyurethane elastomer used for the upper layer may comprise base material, cross-linker and catalyst. The structure of the base material and the ratio of cross-linker to the base material are preferably controlled so as to improve scuffing and solvent resistance.

It is preferable, as the substantially linear polymer used for the top lamina in Case 3, to use a plymeric material, films of which have a Young's modulus ranging over 10 Kg/mm², such as a substantially linear polyurethane elastomer derived from a polyether or an aliphatic polyester, an organic diisocyanate and a chain extender having a large ratio of diisocyanate to the chain extender, and thus a larger hard segment; a substantially linear polyurethane elastomer derived from a polyester glycol which has an aromatic ring in the molecule, an organic diisocyanate and a chain extender; a polyamino acid resin, a polymethacrylic acid ester, a polyvinyl chloride, a polyester resin, a polycarbonate and cellulose acetate. It is possible to use the polymers listed above individually or blends of the linear polymers with each other and with other polymers.

As the solvent-soluble substantially linear polyurethane elastomer used for the middle lamina of Cases 1 and 3 and the top lamina of Cases 2 and 4, there may be used one obtained by reacting a polyether glycol, such as polyethylene glycol, polypropylene glycol, polytetramethyleneglycol, or a polyester glycol, such as polyethylene adipate glycol, polyethylene propylene adipate glycol, polybutylene adipate glycol, polyhexyamethylene adipate glycol and polycaprolactone glycol, or mixtures of these polymers and an organic diisocyanate bifunctional chain extender. It is preferred to use one having high flexibility and high tensile and elongation strength, in order to obtain high abrasion resistance and high folding durability. The polyurethane elastomer may be used alone or in admixture with other polymers mentioned above.

If the upper layer is too thin, abrasion resistance and folding durability of the sheet material are reduced, whereas if it is too thick, the sheet material is heavy and has a hard touch. Accordingly, the optimum thickness of the upper, the middle and the lower layers is in the range defined hereinabove.

If thickness of the upper layer exceeds 100 microns, the resultant sheet material is as heavy, hard and cold to the touch as conventional sheet material having a thick polymeric coating, though superior in surface properties. On the other hand, if the thickness is below 1 micron, a sheet material having sufficient surface properties cannot be produced.

As the substrate, use may be made of paper, knitted, woven or non-woven fabric, and their resin-finished products. It is preferred to use a sheet material described in U.S. Pat. No. 3,424,604 issued Jan. 28, 1969, U.S. Pat. application Ser. No. 813,731, filed Apr. 4, 1969, abandoned and U.S. Pat. application Ser. No. 22,390 filed Mar. 24, 1970, abandoned.

The sheet material of this invention is able to take such various finishing treatments as surface finishing agents, coloring agents, gloss-finishing agents, applied by spraying or dyeing techniques.

If it is desired to enhance the vapor permeability of the sheet material, the upper layer may be perforated by mechanical means such as needle punching, by means of an electric discharge or by addition and elimination of granules or metal granules soluble in the solvent while the surface coating layer is formed. Each pore should be deep enough to reach through the surface non-porous polymeric coating layer and is approximately 0.1 to 100 microns in diameter, preferably 1 to 50 microns in diameter. The pores are not visible to the naked eye. The number of pores is approximately 10 to 100,000/cm$^2$, preferably 100 to 50,000/cm$^2$. After the perforating treatment, the surface is subjected to heat and pressure, thus improving surface appearance and properties and further imparting desired patterns. The surface may be heated and pressed by use of a press plate, press rolls or the like, the surfaces of which can be variously patterned according to uses, e.g., smooth surface, aventurine patterned surface, leather-like surface such as calf, kip, kid, buff, crocodile and lizard leather-like patterns and geometrical patterned surface. The sheet material is put to the finishing by ordinary methods of dyeing and spraying coloring agents thus improving its appearance. This invention enables the production of sheet materials of high quality superior substitutes for leathers.

This invention will be better understood with reference to the embodiments described hereinbelow. In the following examples percentages and parts are by weight unless otherwise specified.

EXAMPLE 1

A solution of polyurethane elastomer (PUE) in dimethyl formamide (DMF), which solution consists of 13% of PUE which is obtained by reacting a polycaprolactone glycol having a molecular weight of 2,000, 4,4'-diphenyl methane diisocyanate (MDI) and ethylene glycol, 5% of water, 1% of carbon black, 2% of stearyl alcohol and 79% of DMF, is spread over a polyethylene sheet (support) to a thickness of 0.6 mm, and is coagulated in a coagulating bath containing 30% of DMF and 70% of water at 30° C. After removing the support and washing and drying the coagulated layer, a porous film of PUE is obtained.

On both sides of the film is bonded a fibrous substrate which is obtained by impregnating a non-woven fibrous mat consisting of 70% of nylon-6 fibers and 30% rayon fibers with a 25% solution in DMF of PUE which is a reaction product of polybutylene adipate glycol having a molecular weight of 2,000 MDI and butylene glycol, coagulating the impregnant and washing and drying the coagulated product. The two substrates are respectively pulled in opposite directions to tear the porous film lengthwise into two halves and in this way are obtained two sheet materials coated with porous napped film which film has a thickness of 0.25 mm.

The porous polymeric nap on the surface of this sheet material is coated with a solution of two parts polyurethane adhesive in ethyl acetate which solution contains 10% of the solid component and a catalyzer by means of a coating roll. The roll coating is repeated 3 times with a 140-mesh gravure roll, and the amount of the solid component on the surface becomes 10 g/m$^2$. After allowing it to stand at room temperature for 30 minutes, during which time the solvent is almost evaporated, the sheet is pressed with a heated roll having a surface temperature of 155° C., and the naps are flattened. The thickness of the sheet is reduced from 0.25 mm to 0.15 mm and the density of the sheet becomes 0.22 g/cc. There are voids of 50 to 220$\mu$ intermingled among those of several microns on the sheet. Despite the porosity of the surface, it is nearly smooth.

Alternatively, a polyethylene film is coated, to a 20$\mu$ thickness of the solid component, with a mixture of an ethyl acetate solution of two parts polyurethane adhesive (solid content 10%) and an ethyl acetate solution of a catalyzer. After removing a greater portion of ethyl acetate by evaporation through a heated zone, the film, which has still some fluidity and adhesiveness, is pressed on the above-described sheet material, and the whole is allowed to stand at 80° C. for 30 minutes, thus allowing the solvent to evaporate completely and the cure to proceed.

After removing the polyethylene film, a sheet material is obtained, the surface of which having the laid-down porous polymeric naps, is coated with a non-porous, cured, polymeric film of 16$\mu$ average thickness. On painting it black and embossing it, there is obtained a sheet material having good leather-like grain, break, appearance and abrasion resistance.

EXAMPLE 2

The napped surface of a sheet material, obtained by the same procedure as described in Example 1, is coated with soft emulsion of polyacrylic ester. THe coating is made with a reverse coater roller to a solid component concentration of 40 g/m$^2$, and then the sheet is dried. Alternatively, a 0.2 mm thick chrome-plated steel belt (support) with sheepskin-like pattern embossing is coated to a solid component concentration of 13 g/m$^2$, with two parts of a 10% ethyl acetate solution of a polyurethane elastomer of the polytetramethylene type, containing 2% light stabilizer. After a 5-minute air drying, the layer of the polyurethane elastomer, which still retains some adhesiveness, is placed on the above-described emulsion-coated napped surface of the sheet and they are bonded together by applying pressure to them. The sheet thus obtained with the belt still attached is heated at 120° C. for 3 minutes, and after cooling, the sheet is separated from the belt. It is finished by spraying color on it. In this way there is obtained a leather-like material with good creases and having no pinholes. This is well suited to be used for boots, bags and upholstery.

EXAMPLE 3

The fibrous substrate described in the second paragraph of Example 1 is coated with a solution in DMF of PUE, which solution consists of 13% of PUE described in the first paragraph of Example 1, 1% of polyvinyl chloride, 1% iron oxide, 0.1% of carbon black, 5% of water, 1.5% of stearyl alcohol and 78.4% of DMF, immersed into a coagulating bath consisting of 30% of DMF and 70% of water kept at 30° C. to coagulate the solution into a porous structure, and then washed and dried. The resulting sheet material is napped by abrading the surface of the coated polyurethane layer. The napped porous polymeric layer has a thickness of 0.36 mm and density of 0.20 g/cc.

A non-porous polymeric layer consisting of PUE as described above, which has a thickness of 8$\mu$ and a Young's modulus of 6 Kg/mm$^2$, is bonded to the surface of the napped porous polymeric layer using 8 g/m$^2$ of cross-linked PUE as adhesive.

Polyethylene film (support) is coated with a mixture of a solution of two-parts type polyurethane elastomer in ethyl acetate and a solution of catalyzer in ethyl acetate so as to obtain a non-porous film having a thickness of 5μ and a Young's modulus of 15 Kg/mm², and then the major part of the ethyl acetate is removed by evaporation through a heated zone so that the film retains only slight liquidity and adhesiveness. The film is pressed on the surface of the non-porous polymeric layer and left at room temperature for 40 hours, allowing the solvent to evaporate completely. The film is then cured. Subsequently, the polyethylene film is removed and the surface of the resulting sheet material is painted brown and embossed.

As the result there is produced a sheet material, having excellent abrasion resistance.

EXAMPLE 4

A solution of PUE, which is prepared by adding 4 parts of stearyl alcohol and 2 parts of carbon black treated with metallic soap to 100 parts of a 15% solution in DMF of PUE (which is a reaction product of polyethylene-propylene adipates having a molecular weight of 2000, p,p'-diphenylmethane diisocyanate and ethylene glycol) is extruded through a slit into a 30% aqueous solution of dimethyl formamide which is kept at 50° C. and coagulated. After washing away the solvent and drying, a film 0.4 mm thick is obtained. Examination of a section with a low magnifying glass revealed a porous, sponge-like structure.

A fibrous substrate described in the second paragraph of Example 1 is stuck on both sides of this polymeric film with an adhesive, and then the two substrates are respectively pulled in the opposite directions to tear off the polymeric film lengthwise into halves. In this way, there are obtained two sheets with their torn-off surface finely napped and having a thickness of 0.21 mm and a density of 0.30 g/cc.

A mixture of a 50% solution of two-parts type polyurethane elastomer in DMF and a 50% solution in DMF, containing 50% catalyzer and 35% cellulose acetate, is spread on the surface of a polypropylene sheet to such an extent as to make a polymeric film with a thickness of 12g/m², and a Yound's modulus of 15 Kg/mm². Then ethyl acetate is removed by evaporation. This surface is further coated with a soution, consisting of 15% of the linear polyurethane elastomer described in the first paragraph of Example 1, 15% of dimethyl formamide and 70% of tetrahydrofuran, to such an extent that the amount of the polyurethane elastomer becomes 5 g/m² to make a polymeric layer of which the Young's modulus is 6 Kg/mm². When the solvent has almost been removed by evaporation with 80° C. heated wind, the above mentioned finely napped sheet is pressed on it to achieved close contact between them, and then the polypropylene sheet is taken off.

The sheet is painted black and embossed, and in this way a sheet material excellent both in appearance and physical properties is obtained.

EXAMPLE 5

A black porous polymeric layer is obtained by providing a polymeric film which consists of a mixture of 8 g/m² of polyurethane elastomer (PUE) described in the first paragraph of Example 1 and 0.2 g/m² of cellulose octadecylurethane on a polyethylene sheet (support), coating on the polymeric film a solution consisting of 14% of the same PUE, 2.2% of stearly alcohol, 4% of water and 79.8% of dimethyl formamide (DMF). The coated film is then coagulated in a coagulating bath comprising 30% of DMF and 70% of water maintained at 30° C. The polyethylene sheet is then removed, washed and dried.

A fibrous substrate is obtained by making a non-woven fibrous mat with mixed-spun fibers consisting of 50% of nylon-6 and 50% of polystyrene, impregnating the fibrous mat with a solution of PUE in DMF, which solution consists of 30% of PUE (which is a reaction product of polyethylenepropylene adipate glycol, MDI and ethylene glycol), 2% of sorbitan monostearate, 2.5% of stearyl alcohol and 65.5% of DMF, coagulating the impregnant in a coagulating bath consisting of 40% of DMF and 60% of water maintained at 40° C, washing and drying the resulting product, and extracting and removing the polystyrene in the fiber by treatment with toulene at 70° C.

In the same way as in Example 1, using the above-described porous polymeric layer and substrate, are obtained two sheet materials covered with a napped porous polymeric layer. After painting light brown, this sheet material is pressed, with a heated roll in the presence of two-parts type polyurethane, and in this way it is turned into a smooth porous polymeric layer.

A polyethylene sheet is coated with a solution in DMF of polyurethane elastomer derived from polyethylene glycol, MDI and ethylene glycol to a 6μ thickness of the elastomer, and dried. A roll consisting of polyethylene is coated, with a solution of two-parts type polyurethane in ethyl acetate and a solution of catalyzer in ethyl acetate to a 16μ thickness of the solid component. After removing the major portion of ethyl acetate by evaporation, this is transferred to the above-described smooth porous polymeric layer. On the transferred layer the polyurethane elastomer layer coated on the polyethylene sheet is brought into contact. Pressure is applied on them to make them bonded, and after allowing to stand overnight, the polyethylene sheet is taken away. In this way is obtained a sheet material, on whose smooth surface with naps laid down is bound a non-porous polyurethane film by means of two parts type polyurethane. After painting light brown and embossing, then is produced a lustrous smooth sheet material with excellent bending resistance.

EXAMPLE 6

Example 5 is repeated using a substrate which is obtained by the steps described below.

Mixed-spun fibers of 3 deniers and composed of 50 parts of nylon-6 and 50 parts of polypropylene were crimped and cut and the staple fibers obtained were formed into a web by using an air flow. The web was subjected to needle punching to obtain a three dimensionally entangled non-woven fibrous mat of 600 g/m². The mat was impregnated with a solution consisting of 40 parts of zinc chloride and 60 parts of methanol, which is a non-solvent for polypropylene but is a solvent for nylon-6, at room temperature and the mat thus impregnated was squeezed by a press roll so as to adjust the amount of solution impregnated at 200 g/m². The mat thus treated was left to stand for 20 minutes to allow the major part of nylon-6 in the mixed-spun fibers to dissolve out and to make a fibrous mat consisting of fibers which were composed of a bundle of ultra-fine fibers of polypropylene being impregnated with a solution of the nylon-6. Thereafter, the mat was dipped in water at 50° C. for 20 minutes to coagulate and deposit the nylon-6 solution between the fibers uniformly in cellulose polymeric structure and then treated with water at 80° C. to remove zinc chloride and methanol and dried.

EXAMPLE 7

A solution of PUE and DMF which consists of 13% of PUE described in the first paragraph of Example 1, 5% water, 1% of stearyl alcohol and 81% of DMF is prepared. This is spread over a polyethylene sheet, which has preliminarily been coated with a $6\mu$ thick film, consisting of 93% PUE and 7% cellulose octadecylurethane and the solution is coagulated at 30° C. in a coagulating bath containing 30% DMF and 70% water. The polyethylene sheet is removed and the result is washed, dried and dyed in black. Thus a porous film is obtained. Two substrates described in Example 5 are bonded on both sides of the film and then the film is torn off lengthwise into halves by pulling the two substrates respectively in opposite directions. In this way are obtained two sheet materials, each consisting of the substrate coated with napped porous polymeric layer.

The napped surface of the sheet material is coated with a solution of two-parts type polyurethane in ethly acetate containing 10% solid component and a catalyzer. This is done by 3-time roll coating, and the solid component amount becomes 10 g/m². The sheet is allowed to stand at room temperature for 30 minutes, thus making most of the solvent evaporate. Then it is pressed with the heated roll of 155° C. As the result, the naps are laid down and the thickness of the sheet is reduced from original 0.25 mm to 0.15 mm. In the sheet, there are voids about $50 - 100\mu$ in diameter intermingled among those of several microns.

A film of PUE with a Young's modulus of 5.5 Kg/mm² (obtained by coating a polyethylene sheet with a solution of the PUE as described above to an $8\mu$ thickness of PUE and then drying) is bonded, by means of two parts type polyurethane, on the porous surface of the above-described sheet. On it, is further placed a $3.5\mu$ thick, still adhesive film of curable PUE cast on a polyethylene film, and the whole is allowed to stand overnight. When the polyethylene film is removed, a sheet is obtained on whose porous surface with laid down naps is bonded a non-porous film of linear PUE having a Young's modulus of 5.5 Kg/mm² and cured PUE having a Young's modulus of 30 Kg/mm² by means of two-parts type polyurethane. After painting black and embossing, the sheet has a pleasing appearance, is excellent in surface ability and bending resistance, and is suitable for use in shoes, handbags and other articles.

EXAMPLE 8

Example 7 is repeated using a substrate which is obtained by the steps described in the Example 6.

EXAMPLE 9

A solution of PUE in DMF containing 13% of PUE described in the first paragraph of Example 1, 5% of water, 1% of carbon black and 1% of stearyl alcohol, is spread to 0.7 mm thick on a polyethylene sheet, and coagulated at 30° C. in a coagulating bath containing 30% dimethyl formamide and 70% water. After removing the polyethylene sheet and removing the solvent and drying, a porous film is obtained. On both sides of the film a substrate, as described in Example 5, is bonded. By pulling the two substrates in the opposite directions, respectively, the porous film is torn off lengthwise into two halves, and thus two sheet materials of porous surface are obtained. This surface is roll-coated with a solution of two-parts type polyurethane in ethyl acetate and a catalyzer solution in a solid component amount of 10 g/m², and after allowing to stand at room temperature, for 30 minutes the obtained sheet is hot pressed at 155° C. to make the surface smooth.

A polyethylene sheet is coated, in a film thickness of $8\mu$, with a solution in DMF of polyurethane elastomer described in Example 5 (Young's modulus =8.5 Kg/mm²), and after desiccation, this is bonded with two-parts type polyurethane on the above-described sheet material and left to stand for 40 hours. Then the polyethylene sheet is removed. The layer of polyurethane is covered with a $3\mu$ thick film of PUE described in Example 5 with a high Young's modulus (20 Kg/mm²) by coating with a solution in a mixture of DMF and tetrahydrofuran by means of gravure roll. The surface is then embossed and painted black.

The sheet material thus obtained has strong resistance to bending and fatigue and is good in appearance. It is suitable for use in upholstery, covers, handbags, shoes, etc.

EXAMPLE 10

Example 9 is repeated with the exception that a top layer is provided by covering the layer of polyurethane with a $5\mu$ thick film consisting of 60% polyester resin and 40% polyurethane elastomer described in Example 5, and having a Young's modulus of 40 Kg/mm².

EXAMPLE 11

A solution in DMF, containing 13% polyurethane elastomer described in Example 5, 2% carbon black, 1% stearyl alcohol and 6% water is spread to 0.8 mm thick on a substrate described in Example 5. After coagulation at 30° C. in a coagulating bath containing 30% dimethyl formamide and 70% water, the solvent is removed and the resultant sheet is dried. The surface of this sheet is abraded off to 0.2 mm deep with sandpaper, and then treated as described in Example 9 to make it smoother.

On the abraded surface of the sheet material, an $8\mu$ thick film of substantially linear polyurethane elastomer (Young's modulus = 4 Kg/mm²), which has been spread on a polyethylene sheet and dried, is bonded with a two-part type polyurethane. Then on this film is further bonded with two-parts polyurethane a $5\mu$ thick dry film (Young's modulus = 50 Kg/mm²), which has been prepared by blending one part of polyamino acid and one part of polyester resin plus carbon black, and which has been spread on a polyethylene sheet and dried. The whole is allowed to stand overnight at room temperature. The polyethylene sheet is removed and the exposed surface is finished with finishing agent and embossed. The sheet material thus obtained presents a mat appearance and is excellent in scuff resistance. It is useful for covers and upholstery.

EXAMPLE 12

A substrate as in Example 5 was coated with a polyurethane adhesive, and porous polymeric particles were bonded thereto. The polymeric particles were obtained by coagulating a solution in DMF containing 75% PUE derived from polybutylene glycol, MDI and butylene glycol and 15% polymethyl methacrylate and 10% brown pigment as solid component into a porous structure and pulverizing the porous structure. Thus, a finely napped porous polymeric layer bonded on a substrate was obtained.

On the finely napped porous polymeric layer, a layer of cross linkable PUE, which has been made on a metallic roll covered with polyethylene, having a Young's modulus of 0.5 Kg/mm$^2$ and a thickness of 10$\mu$ was transferred. Next, on the layer of cross-linked PUE, another layer of cross-linked PUE, whiich had also been made on a metallic roll covered with polyethylene, having a Young's modulus of 2 Kg/mm$^2$ and a thickness of 6$\mu$, was transferred. On said layers, a topy layer of PUE derived from polyethylene glycol, which has been made on a metallic roll, containing 10% of brown pigment and having a Young's modulus of 25 Kg/mm$^2$ and a thickness of 3$\mu$, was transferred. The resulting sheet material was then embossed.

What is claimed is:

1. A process for producing a sheet material having leather-like grain, excellent scuffing and abrasion resistance and superior dyeability, comprising:

forming a finely napped porous polymeric layer having a thickness of about 0.05 to 2.50 mm, a density of about 0.10 to 0.30 g/cc and a nap length of about 0.03 to 0.5 mm, on a fibrous substrate, said layer containing minute pores of about 0.1 to 100 microns in diameter;

treating the finely napped porous polymeric layer with a nap binding agent of the group consisting of a swelling agent for the polymer of the napped porous polymeric layer, solution of a polymer dissolved in the swelling agent and a two-liquid type curable polyurethane elastomer;

compressing the finely napped porous polymeric layer by about 10 to 90% of its original thickness by means of even pressure in order to obtain a layer having a desinty of from 0.20 to 0.50 g/cc; and, overcoating the resultant compressed material with an upper layer consisting of a non-porous polymeric coating having a thickness of 1 to 100 microns.

2. The process of claim 1 wherein the nap binding agent is a swelling agent for the polymer of the napped porous polymeric layer.

3. The process of claim 2 in which the upper layer has a lamina structure of at least two or more laminae.

4. The process of claim 3 in which the bottom lamina consists of a cross-linked polyurethane elastomer.

5. The process of claim 1 wherein the nap binding agent is a solution of a polymer dissolved in a swelling agent for the polymer of the napped porous polymeric layer.

6. The process of claim 5 in which the upper layer has a lamina structure of at least two or more laminae.

7. The process in claim 6 in which the bottom lamina consists of a cross-linked polyurethane elastomer.

8. The process of claim 1 wherein the nap binding agent is a two-liquid type curable polyurethane elastomer.

9. The process of claim 8 in which the upper layer has a lamina structure of at least two or more laminae.

10. The process of claim 9 in which the bottom lamina consists of a cross-linked polyurethane elastomer.

* * * * *